E. HOWARD & W. H. JACKSON.
Sewing-Machines for Making Button-Holes.
No. 5,336. Reissued March 25, 1873.
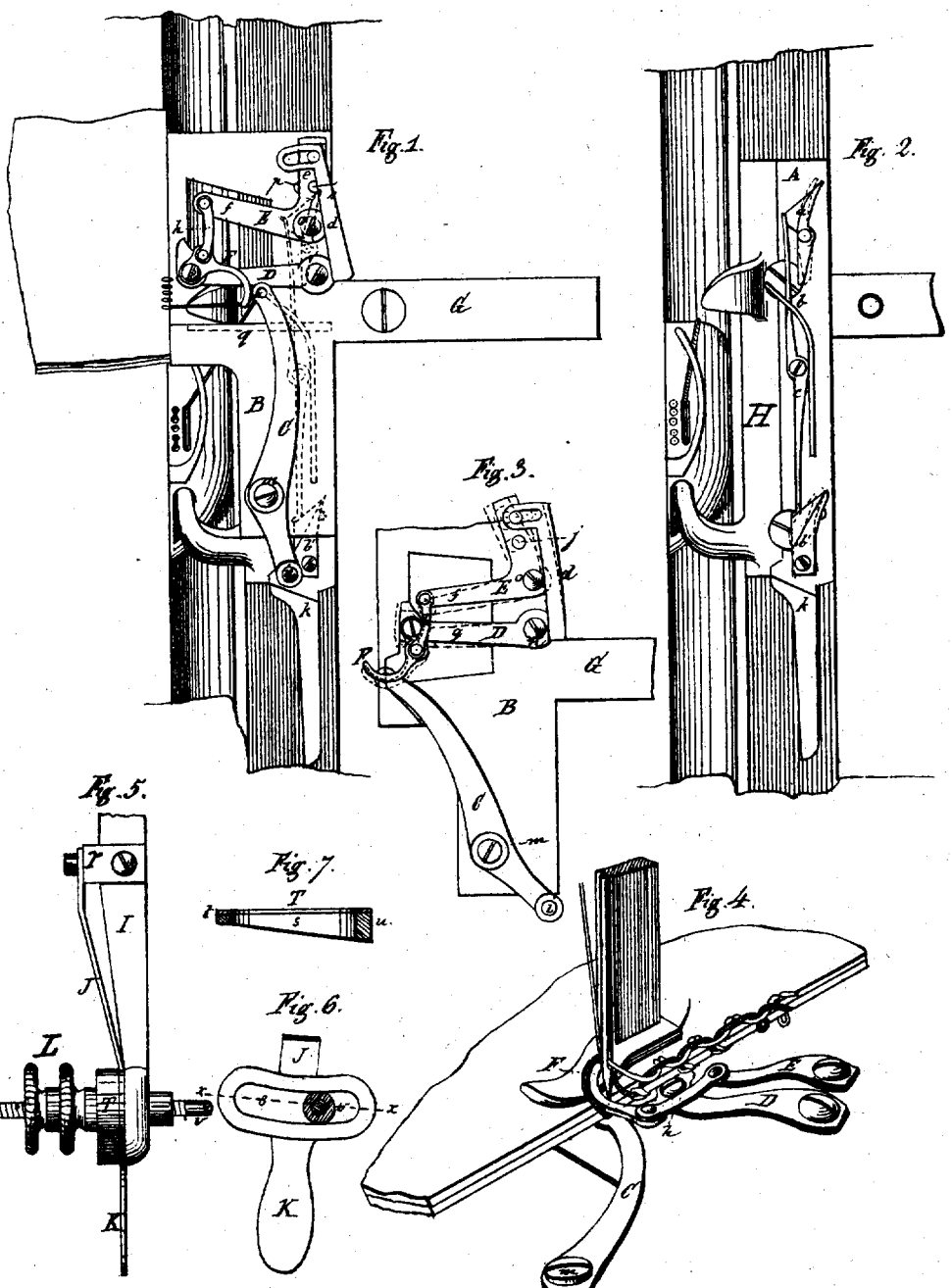
Witnesses
Geo. H. McGrew.
J. E. Knipp.
Inventors
Edmund Howard
William H. Jackson
by J. E. Maynadier
their atty

UNITED STATES PATENT OFFICE.

EDMUND HOWARD, OF FLUSHING, AND WILLIAM H. JACKSON, OF BROOKLYN, NEW YORK, ASSIGNORS, BY MESNE ASSIGNMENTS, TO HENRY E. TOWNSEND, CHARLES P. BRIGHAM, AND GEORGE W. SIMMONS, OF BOSTON, MASSACHUSETTS.

IMPROVEMENT IN SEWING-MACHINES FOR MAKING BUTTON-HOLES.

Specification forming part of Letters Patent No. 94,212, dated August 31, 1869; reissue No. 5,336, dated March 25, 1873.

*To all whom it may concern:*

Be it known that we, EDMUND HOWARD, of Flushing, Queens county, in the State of New York, and WILLIAM H. JACKSON, of Brooklyn, Kings county, in the State of New York, have invented certain Improvements in Sewing-Machines, of which the following is a specification:

Our invention consists in certain improvements in mechanism described in Letters Patent No. 69,671, dated October 8, 1867, granted to us. In that mechanism the device for catching the under thread was a hook, from which, as is obvious, the under thread might possibly escape; and as an additional precaution a hole was drilled through the slide which carried this hook. The main feature of our present invention consists in substituting for this hook an arm with a hole drilled through it, or more properly a blunt needle with an eye near its end. The minor features of our invention consist in certain details of the mechanism.

In the drawing, Figure 1 is a plan of the bed of a sewing-machine in which a plate bearing the mechanism for catching and carrying the under thread has been substituted for the ordinary throat-plate of the machine; Fig. 2, the same with the plate removed; Fig. 3, the plate and mechanism detached from the bed of the machine.

The device for catching the under thread and the device for laying it upon the upper side of the fabric are arranged upon a plate, B, which can be readily applied to and removed from the sewing-machine in order that it may be used for plain sewing or for button-hole sewing, as desired. The device for catching the under thread is an eye drilled through a lever, C, near its end. This eye lies directly under the throat in the plate B so that the needle shall descend through it, and consequently forms a part of the throat of the machine. The throat in the plate B is open, as described in our former patent, and the under thread is drawn into the eye precisely as it is drawn into the hook and the hole in the slide in our former patent, or it may be passed by hand through the eye, if desired; but it will be plain that it is impossible for this thread to escape from the eye, unless it breaks. As this device for catching the under thread is a hole or eye through a piece of metal, it follows that it must always return to its position as part of the throat at each descent of the needle so that the needle can pass into it, and that it must carry the under thread and return while the needle is above the throat. This eye is formed near the end of the lever C, which is attached by its fulcrum *m* to the plate B. The long arm of this lever is curved slightly both in its vertical and horizontal planes so as to be parallel with that portion of plate B which is immediately under its range of motion, and also so that its eye may be brought directly under the throat in the plate B. This lever is actuated by the spring-cam *b′* on the plate A working against the pin *i*. When the plate A, which is secured to the shuttle-carriage, begins its forward motion the pin *i* rests against the rear face of the cam or guide *k*, the eye being directly under the throat. As the plate A reaches the end of its motion the rear face of the cam *b′* strikes the pin *i*, but as the long arm of C has a solid bearing, when in this position against part of plate B, the cam *b′* is forced to move on its pivot against its spring *c*, so that when the pin *i* passes it flies back into place, and upon the return movement of the plate A the pin *i* comes in contact with the front face of the cam *b′*, thus throwing the lever into the position shown in Fig. 1. The pin *i* returns to the rear face of cam *k* by passing between the butts of cams *k* and *b′*. A pin, *j*, attached to the arm *e* of the elbow-lever E, projects downward through the plate B, and is actuated by the cams *a* and *b*, the former of which is a spring-cam, the pin *j* bearing against its rear face, pressing it out of the way against its spring, and thereby being brought to bear against its front face. The return motion of the pin *j* is caused by the rear face of cam *b*. The elbow-lever E is thus moved back and forth on its fulcrum, and its motions actuate the finger F, which is curved in both its vertical and horizontal planes, and provided on its outer edge and front end with a groove to catch the thread and guide it to its place on the upper side of the fabric so that the needle shall pass through it. This finger F is connected to the elbow-lever E by the rod *h*, and its pivot is on the end of a second elbow-lever, D, which is moved very slightly, in order to change the position of the finger by means of a second pin projecting upward from the arm *e* of the lever E, and entering a link on the arm *d* of the lever D. The lever D, therefore, is moved only when the lever E has nearly completed its motions. To the under side of the plate B is attached at one end a straight spring, *q*, as shown by the dotted lines in Fig. 1, and with its free end toward the throat of the machine.

The operation is as follows: The upper thread is adjusted as usual, and also the lower thread, except that it is passed between the spring *q* and plate B, and then through the eye in the blunt needle C, if the lever is thrown back, as shown in Fig. 1. The spring *q* is for the purpose of securing a more perfect tension. The needle descends through the open throat in the plate B, and through the eye in C, carrying its thread, through the loop of which the shuttle passes in the usual way, and as the shuttle returns the devices take the position clearly shown in Fig. 1. This position is taken almost immediately after it commences its return, and as it continues its return the hook F catches the lower or shuttle thread in the groove on its end, and carries it forward over the throat, the long arm of the lever C quickly following it, and, taking a position with its eye directly under the throat at the same instant, the arms *f* and *g* of the elbow-lever D and E move a short distance in the direction of the forward line of the shuttle, carrying the hook F with them, which, by this motion, spreads or opens the thread into a loop, gets out of the way of the needle, and returns to its former position. As it returns the needle goes through the loop thus formed, and on through the throat in the plate and the eye in the end of the lever C, carrying its thread with it, through the loop of which the shuttle again passes; then, as the needle ascends, and as soon as it rises from the throat, the arm of the lever C draws the stitch tight.

In operating the machine with our attachment we have found it necessary oftentimes, and especially in forming the stitches around the inner ends of button-holes against which the eye of the button bears, to have the feed-regulator so present the edge of the curve of the button-hole that the stitches about this curve will be uniform with the rest of the work. To do this, it is necessary that the feed gradually move more rapidly, as the stitches are worked from the beginning of the curve to its highest point, and, in like manner, move slower as it passes from this point to the straight edge of the button-hole. The reason for this is that, unless it were done, the stitches about the curve would not be at uniform distances. To accomplish this, we attach to the leg I of the brake or feeding-device a stitch-regulator or device for regulating the feed, as desired, and so arrange it that the operator can increase or diminish the rapidity of the feed at the same time, without interfering with his general management of the work. This device is shown in Figs. 5, 6, and 7, and consists of a spring, J, with a yoke, *r*, attached loosely to its upper end, which yoke straddles and is secured to the arm I of the usual rock-shaft. The lower end of this spring is connected by rod *v* with the usual leg for clutching the feed-wheel. This spring is flat, and Fig. 5 shows an edge view; its lower end is provided with a wedge-shaped piece, T, having a curved oblong slot or opening, S, below which projects a handle, K, as shown in Fig. 6, which presents a front view. The material forming this slot is made wedge-shaped longitudinally, as clearly shown in section in Fig. 7, the smaller end being at *t* and the larger at *u*. The slot S, in attaching the spring to the leg of the brake, is slipped on the rod *v* connecting the leg of the brake to the brake itself of the machine, and over it are placed the thumb-nuts L ordinarily used to regulate the length of the rod *v*, and through it the feed and length of stitch. Instead of using these thumb-nuts we use our stitch-regulator.

We have found from experience that the thumb-nuts cannot be manipulated with sufficient ease and rapidity to regulate the feed as desired for turning the curve in the button-hole; but, by means of our device, the rod *v* is gradually lengthened or shortened by simply swinging or turning our stitch regulator backward or forward, the wedge-shaped piece T and the action of the spring accomplishing this result.

What we claim as our invention is—

1. The improved under-thread catcher, consisting of an arm with an eye near its end, when constructed and operating so that it shall move away from the throat of the machine with the under thread, while the needle is above it, and return to the throat, so that the needle shall pass through it at each descent, all substantially as set forth.

2. The vibrating finger F, when constructed and arranged substantially as described, and moving not only on its pivot but also bodily in order to carry the under thread up over the edge of the fabric, and then move out of the way of the needle, as set forth.

3. The special mechanism for giving the two motions to the finger F, above set forth, said mechanism consisting of the two elbow-levers, D and E, connected together by the pin on one arm of the lever E, and the link on one arm of the lever D.

4. A thread carrier and catcher, substantially as described, provided with pins *i j* and operated by cams *a*, *b*, *b'*, and *k*, substantially as set forth.

5. The pivoted wedge-shaped piece T, in combination with the rocking-arm I for varying the extent of the feed motion, substantially as described.

EDMUND HOWARD.
W. H. JACKSON.

Witnesses:
JAMES R. HENRY,
H. W. MABIE.